(12) United States Patent
Wu

(10) Patent No.: US 6,540,235 B2
(45) Date of Patent: Apr. 1, 2003

(54) GRADUATED ROTATION CONTROL CHUCK ASSEMBLY

(76) Inventor: Shang-Shiun Wu, No. 396, Chien Te Street, Taichung (TW)

( * ) Notice: Subject to any disclaimer, the term of this patent is extended or adjusted under 35 U.S.C. 154(b) by 0 days.

(21) Appl. No.: 09/901,651

(22) Filed: Jul. 11, 2001

(65) Prior Publication Data

US 2003/0011146 A1 Jan. 16, 2003

(51) Int. Cl.$^7$ .......................... B23Q 16/02; B23B 31/30
(52) U.S. Cl. ............................................................ 279/5
(58) Field of Search ........................... 279/5, 4.02, 4.11, 279/111, 126

(56) References Cited

U.S. PATENT DOCUMENTS

| 4,209,181 A | * | 6/1980 | Morawski ...................... 279/5 |
| 4,811,963 A | * | 3/1989 | Bronzino et al. ........... 279/130 |
| 5,123,348 A | * | 6/1992 | Henson ...................... 101/245 |

FOREIGN PATENT DOCUMENTS

| DE | 2918769 | * | 2/1981 | ..................... 279/5 |
| EP | 258557 | * | 3/1988 | ..................... 279/5 |
| JP | 60-123204 | * | 7/1985 | ..................... 279/5 |
| SU | 627923 | * | 10/1978 | ..................... 279/5 |

* cited by examiner

*Primary Examiner*—Raleigh W. Chiu
(74) *Attorney, Agent, or Firm*—Browdy and Neimark, P.L.L.C.

(57) ABSTRACT

A graduated rotation control chuck assembly includes a base, a holding-down rod axially slidably mounted in the base, and a graduated rotation control unit, the graduation unit including a rotary shaft, mounted in the base and axially aimed at the holding-down rod to hold with the holding-down rod the workpiece to be processed, the rotary shaft having a first contact portion and a second contact portion, a first piston rod, and a second piston rod axially inserted through the first piston rod and mounted with the first piston rod in the base and being alternatively reciprocated against the first contact portion and second contact portion of the rotary shaft to rotate the rotary shaft step by step at a fixed angle per step.

12 Claims, 8 Drawing Sheets

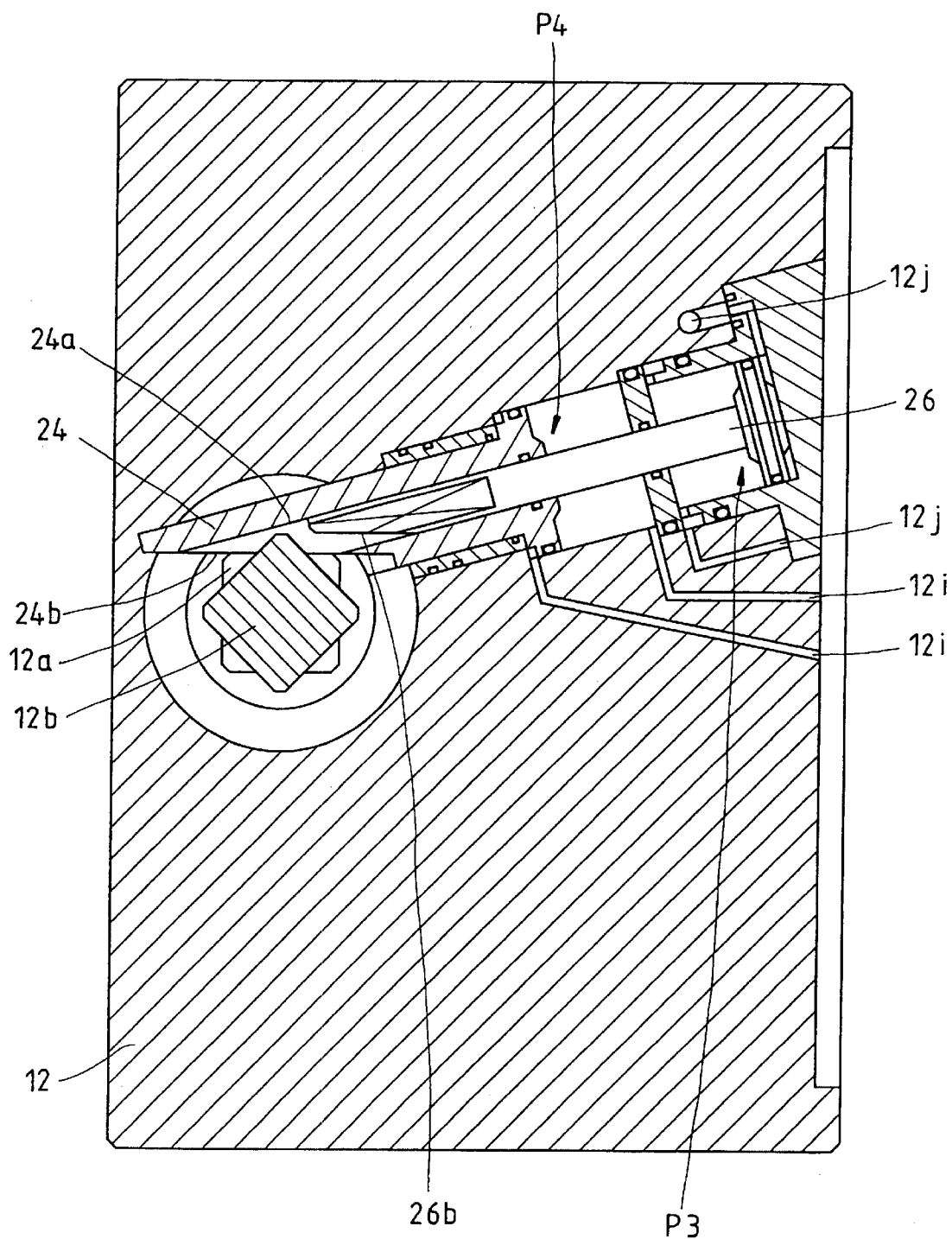
F I G. 10

GRADUATED ROTATION CONTROL CHUCK ASSEMBLY

BACKGROUND OF THE INVENTION

The present invention relates to a chuck assembly for installation in the main shaft of a cutting metalworking machine to hold the workpiece for processing and, more particularly, to a graduated rotation control chuck assembly, which can be controlled to rotate the workpiece step by step at a fixed angle per step.

FIGS. 1 and 2 show a graduated rotation control chuck assembly 1 according to the prior art. This structure of graduated rotation control chuck assembly 1 uses a retractable holding-down rod 2 and a rotary shaft 3 to hold the workpiece 4, and two piston rods, namely, the first piston rod 5 and the second piston rod 6 to control rotation of the rotary shaft 3 step by step at 45° per step. The first piston rod 5 and the second piston rod 6 are reciprocated and alternatively forced against the square shaft body of the rotary shaft 3, causing the workpiece 4 to be rotated step by step at 45° per step. This structure of graduated rotation control chuck assembly is functional, however it still has drawbacks. Because the graduated rotation control chuck assembly must have two receiving holes 7;8 to hold the first piston rod 5 and the second piston rod 6 separately, the fabrication of the base of the graduated rotation control chuck assembly is complicated. Because the first piston rod and the second piston rod 6 are set subject to a predetermined contained angle and alternatively reciprocated against the shaft body of the rotary shaft 3, the precision requirement of the component parts of the graduated rotation control chuck assembly 1 is critical. Further, in case the angle per step of the rotary motion of the rotary shaft is to be changed, the geometric cross section of the rotary shaft 3 as well as the contained angle of the piston rods 5;6 must be relatively changed, i.e., the base of the graduated rotation control chuck assembly 1 fits only one particular angle per step rotation requirement.

SUMMARY OF THE INVENTION

The present invention has been accomplished to provide a graduated rotation control chuck assembly, which eliminates the aforesaid drawbacks. It is therefore an object of the present invention to provide a base for a graduated rotation control chuck assembly, which is easy to fabrication, and less critical in precision requirement. It is another object of the present invention to provide a base for a graduated rotation control chuck assembly, which fits requirements for different rotary angles. To achieve these and other objects of the present invention, the graduated rotation control chuck assembly comprises a base, the base comprising a workpiece receiving chamber, the workpiece receiving chamber having a first lateral side and a second lateral side opposite to the first lateral side; a holding-down rod mounted in the base inside the first lateral side and aimed at the second lateral side and moved axially in and out of the workpiece receiving chamber; and a graduated rotation control unit, the graduation unit comprising a rotary shaft mounted in the base inside the second lateral side and axially aimed at the holding-down rod, the rotary shaft comprising a first contact portion and a second contact portion, a first piston rod, and a second piston rod, the first piston rod and the second piston rod being axially sleeved one inside the other and mounted in the base; wherein the first piston rod and the second piston rod are alternatively reciprocated against said first contact portion and second contact portion of the rotary shaft, causing the rotary shaft to be rotated step by step at a fixed angle per step.

BRIEF DESCRIPTION OF THE DRAWINGS

FIG. 10 is similar to FIG. 9 but showing the rotary shaft rotated to another angle.

DETAILED DESCRIPTION OF THE PREFERRED EMBODIMENT

Figure 1:
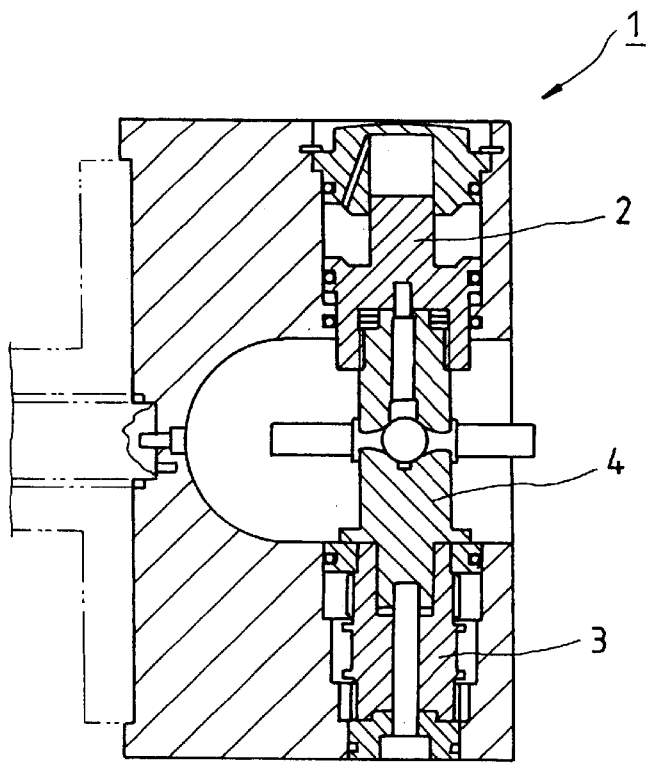
FIG. 1 is a sectional view of a graduated rotation control chuck assembly according to the prior art.
Figure 2:
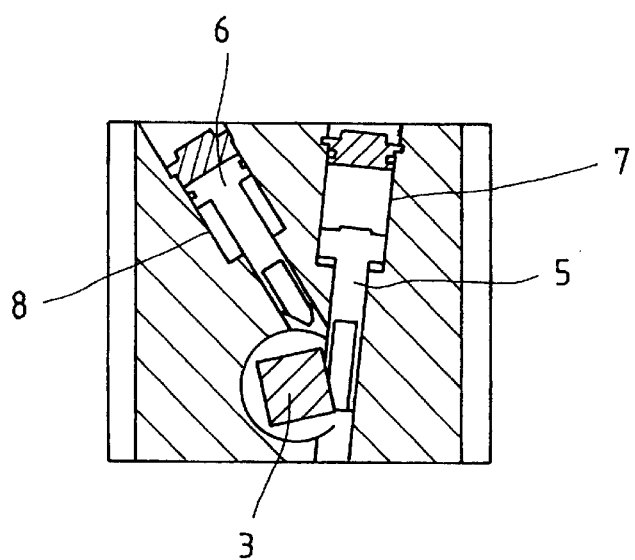
FIG. 2 is another sectional view of the graduated rotation control chuck assembly according to the prior art.

Referring to FIGS. From 3 though 8, a graduated rotation control chuck assembly 10 in accordance with the present invention is shown comprised of a base 12, a holding down mechanism 14, a graduated rotation control unit, and a detection unit 18.

The base 12 is a cylindrical member fixedly connected with the bottom side thereof to one end of the main shaft 20 of the cutting metal-working machine for synchronous rotation with the main shaft 20, a workpiece receiving chamber 12a in the top side thereof, the workpiece receiving chamber 12a having a first lateral side 12b and a second lateral side 12c, a first cavity 12e and a second cavity 12f respectively extended through the first lateral side 12b and the second lateral side 12c in communication with the recessed receiving chamber 12a at two opposite lateral sides, a third cavity 12g disposed in the bottom side in communication with the second cavity 12f, a first pressure loop 12h disposed in communication with the first cavity 12e, and a second pressure loop 12i and a third pressure loop 12j respectively disposed in communication with the third cavity 12g.

The holding-down mechanism 14 is mounted in the base 12 corresponding to the first lateral side 12b, comprising an axle sleeve 14a, a holding-down rod 14b, and an end cap 14c. The axle sleeve 14a is axially movably mounted in the first cavity 12e of the base 12. The holding-down rod 14b is supported in two thrust bearing 14d in the axle sleeve 14a, having one end fastened with a nut 14e that enables the holding-down rod 14b to be rotated relative to the axle sleeve 14a but stops the holding-down rod 14b from axial displacement relative to the axle sleeve 14a. The end cap 14c is fastened to the base 12 by screws to close the outer open end of the first cavity 12e, preventing the holding-down mechanism 14 from falling out of the base 12. By means of controlling the flowing direction of the compressed flow of air (fluid) in the first pressure loop 12h, the axle sleeve 14a and the holding-down rod 14b are moved forwards/backwards in the first cavity 12e of the base 12 relative to the second lateral side 12c.

Figure 6:
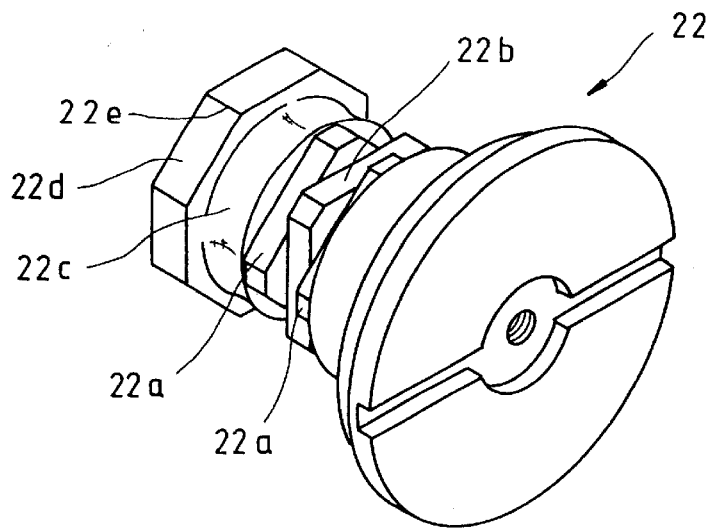
FIG. 6 is a perspective view of the rotary shaft for the graduated rotation control chuck assembly according to the present invention.
Figure 7:
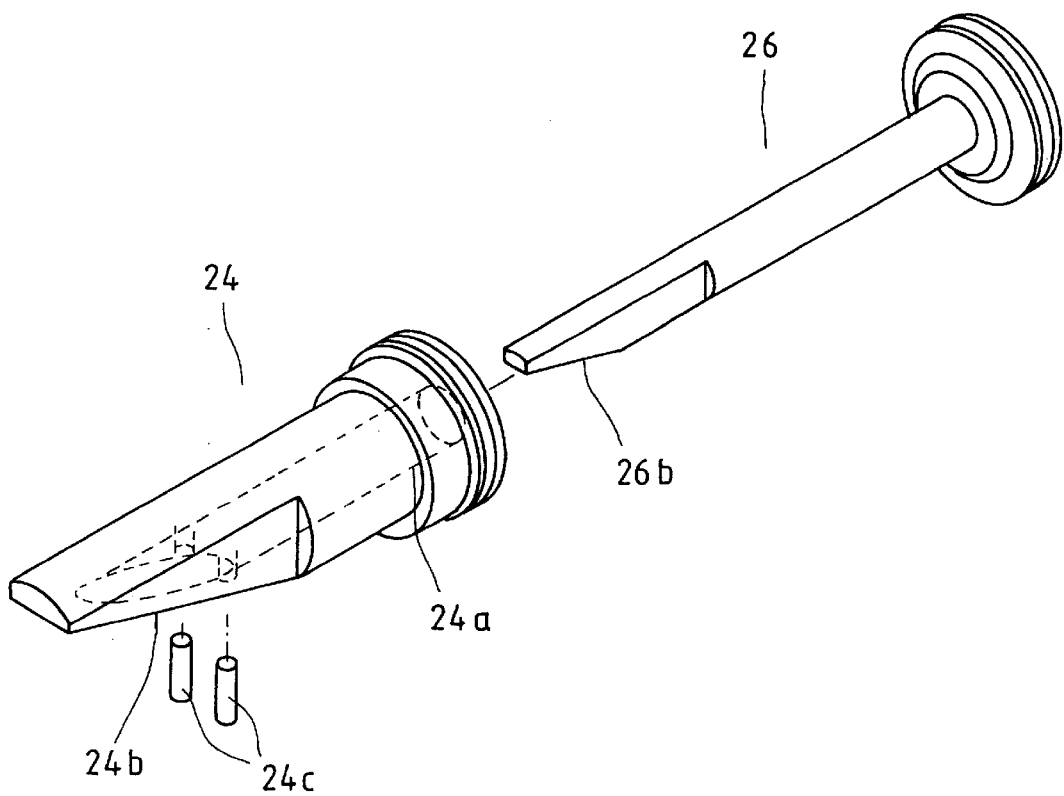
FIG. 7 is a perspective view of the first piston rod and second piston rod for the graduated rotation control chuck assembly according to the present invention.

The graduated rotation control unit comprises a rotary shaft 22 mounted in the second cavity 12f of the base 12, a first piston rod 24 and a second piston rod 26 mounted in the third cavity 12g, and an end cap 28 fastened to the outer open end of the third cavity 12g. The rotary shaft 22 is mounted in the second cavity 12f in the second side 12c and axially aimed at the holding-down rod 14b, comprising a first contact portion 22a, a second contact portion 22b, an annular groove 22c, and a positioning portion 22b. The first contact portion 22a and the second contact portion 22b have a square cross section, and are biased from each other at 45°, as shown in FIG. 6. The four right angles of each of the first contact potion 22a and the second contact potion 22b are respectively chamfered. The positioning portion 22d has an octagonal cross section with eight angles 22e. Further, a positioning rod 30 is fixedly mounted in the base 12 and disposed in tangent to the periphery of the annular groove 22c of the rotary shaft 22, and adapted to stop the rotary shaft 22 from axial movement during rotation, i.e., the positioning rod 30 prevents the rotary shaft 22 from escaping out of the second cavity 121. The first piston rod 24 comprises an axially extended through hole 24a, and a beveled stop edge 24b. The second piston rod 26 is inserted into the axially extended through hole 24a of the first piston rod 24 and coaxially mounted with the first piston rod 24 in the third cavity 12g of the base 12, having a beveled stop edge 26b. Further, two pins 24c are fastened to the first piston rod 24 to guide axial movement of the second piston rod 26 in the axially extended through hole 24a, and to stop the second piston rod 26 from rotary motion relative to the first piston rod 24. An annular spacer 32 is fixedly provided in the third cavity 12g between the first piston rod 24 and the second piston rod 26, defining a center through hole 32a. The second piston rod 26 is inserted through the center through hole 32a of the ring spacer 32 into the axially extended through hole 24a of the first piston rod 24. By means of controlling the flowing direction of the compressed flow of air (fluid) in the second and third pressure loops 12i;12j, the first piston rod 24 and the second piston rod 26 are alternatively reciprocated, and therefore the beveled stop edge 24b of the first piston rod 24 and the beveled stop edge 26b of the second piston rod 26 are alternatively forced against the first contact portion 22a and the second contact portion 22b, causing the rotary shaft 22 to be rotated (this will be described further).

Figure 3:
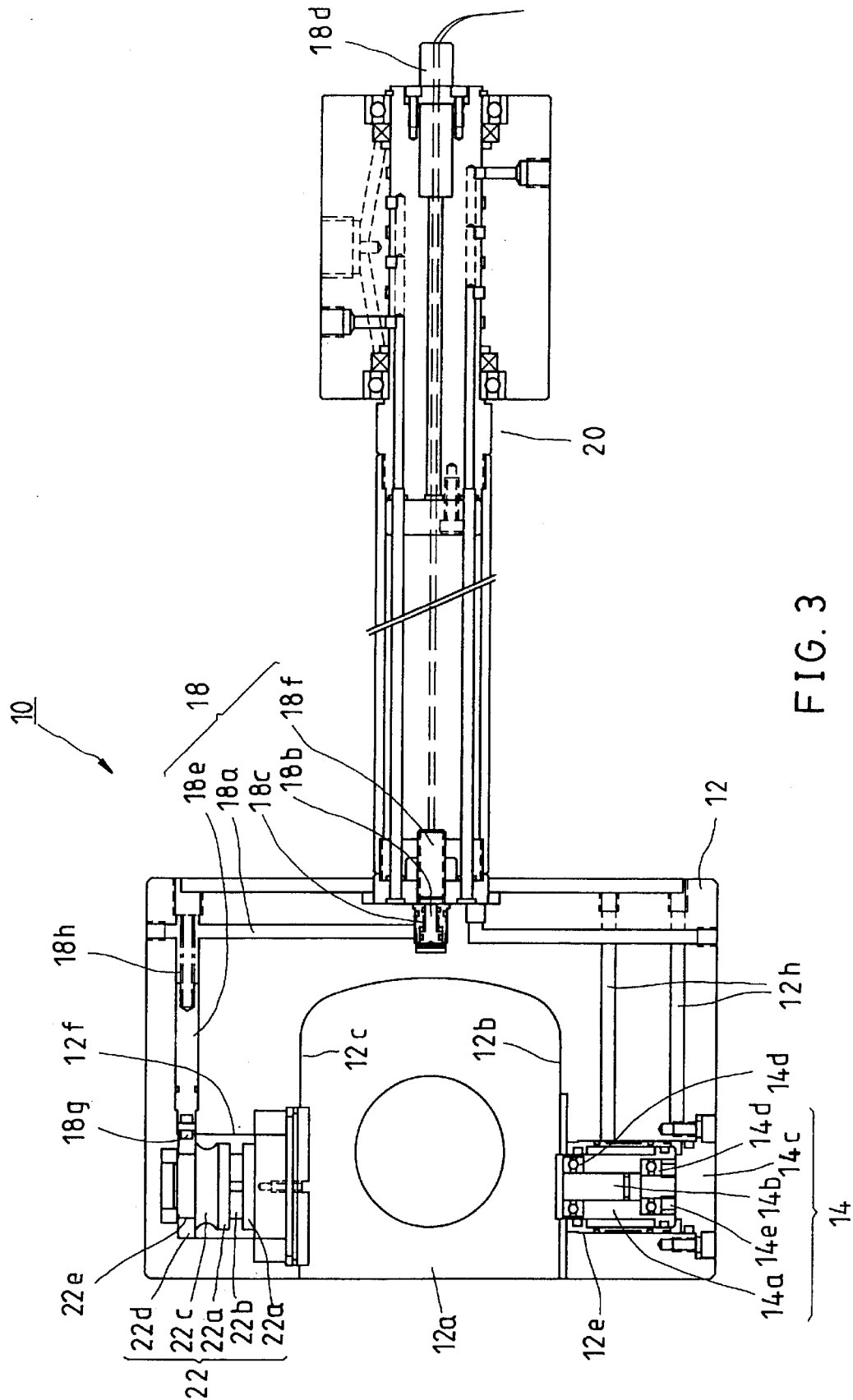
FIG. 3 is a sectional view showing a graduated rotation control chuck assembly constructed according to the present invention and installed in the main shaft of a cutting metalworking machine.
Figure 4:
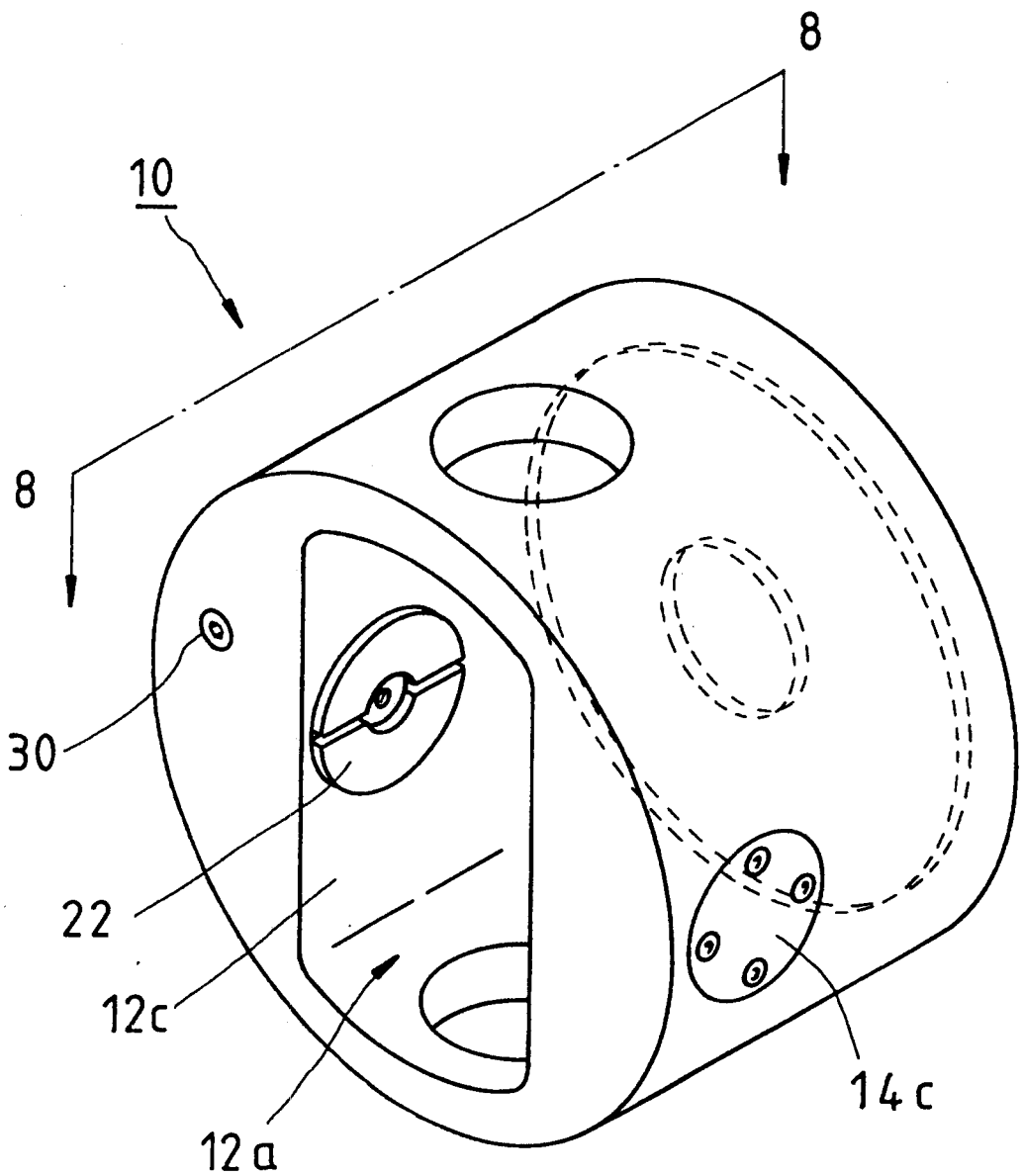
FIG. 4 is a perspective view of the graduated rotation control chuck assembly according to the present invention.
Figure 5:
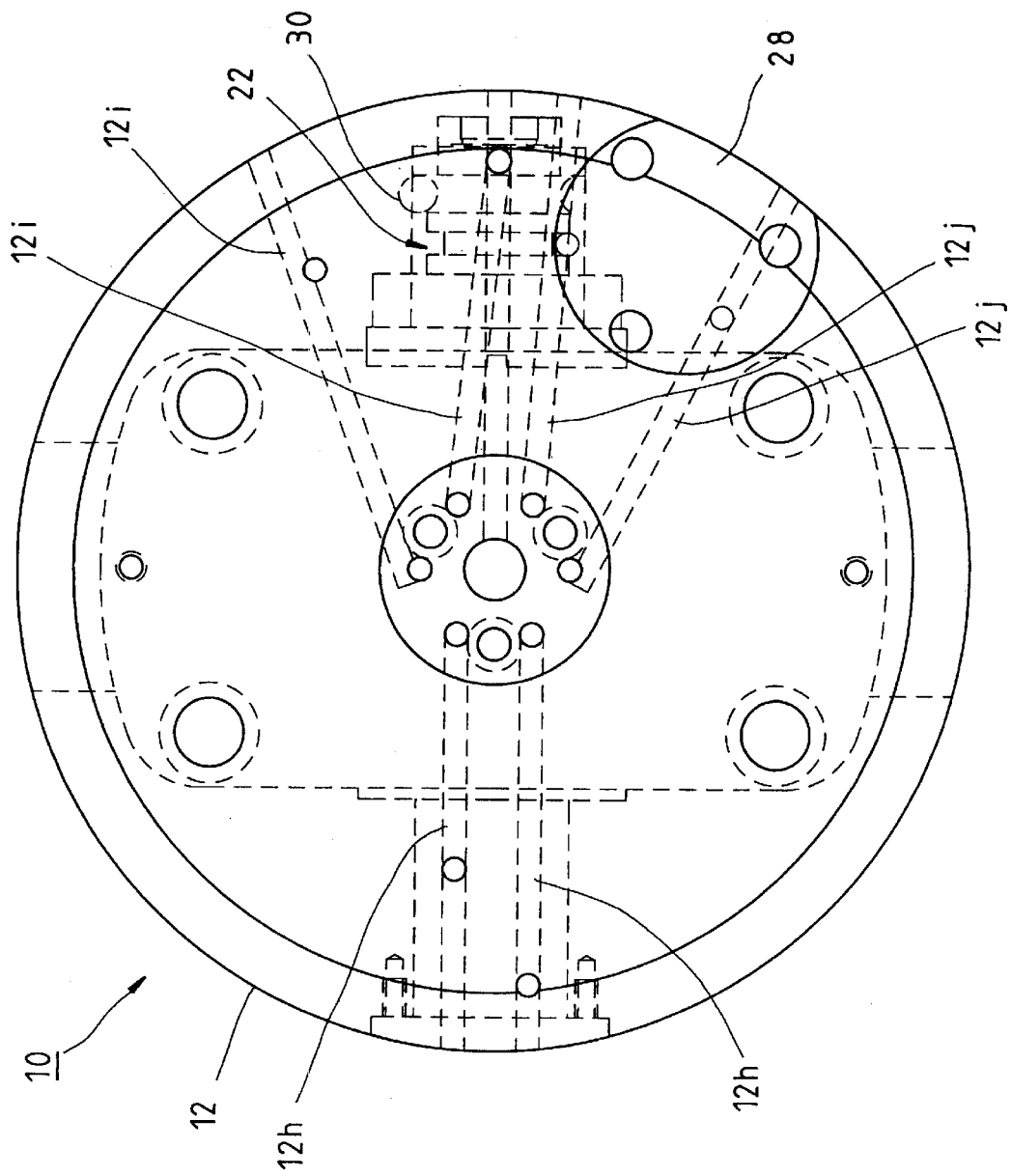
FIG. 5 is a bottom plain view of the graduated rotation control chuck assembly according to the present invention.

Referring to FIG. 3, the detection unit 18 comprises an oil passage 18a, an actuating rod 18b, a spring member 18c, a proximity switch 18d, and a pushpin 18e. The oil passage 18a is provided in the base 12 and filled with a hydraulic fluid, having one end extended to the second cavity 12f and the other end extended to the bottom side of the base 12 in communication with the outside. The actuating rod 18b is sealed in one end of the oil passage 18a in the bottom side of the base 12, and moved in and out of the bottom side of the base 12 by means of the pressure of the hydraulic fluid or the spring power of the spring member 18c being mounted on the actuating rod 18b. The proximity switch 18d has a probe 18f fastened to the bottom side of the base 12 and adapted to detect displacement of the actuating rod 18b and to output an electric signal subject to displacement of the actuating rod 18b. The push pin 18e is axially slidably sealed in the other end of the oil passage 18a, having one end pivoted to a roller 18g, which is disposed in contact with the positioning portion 22d of the rotary shaft 22, and the other end supported on a spring 18h. When rotating the rotary shaft 22 to the desired angular position, the push pin 18e is forced by the angles 22e of the rotary shaft 22 to move axially and to force the hydraulic fluid against the actuating rod 18b, thereby causing the actuating rod 18b to be extended out of the bottom side of the base 12 and detected by the proximity switch 18d. On the contrary, when the push pin 18e is stopped against the positioning portion 22d beyond the angles 22e, the actuating rod 18b is forced back to the inside of the base 12 by the spring member 18c, and at this moment, the proximity switch 18d detects no signal, i.e., the positioning of the rotary shaft 22 is detected by means of the operation of the proximity switch 18d in detecting the position of the actuating rod 18b.

Figure 8:
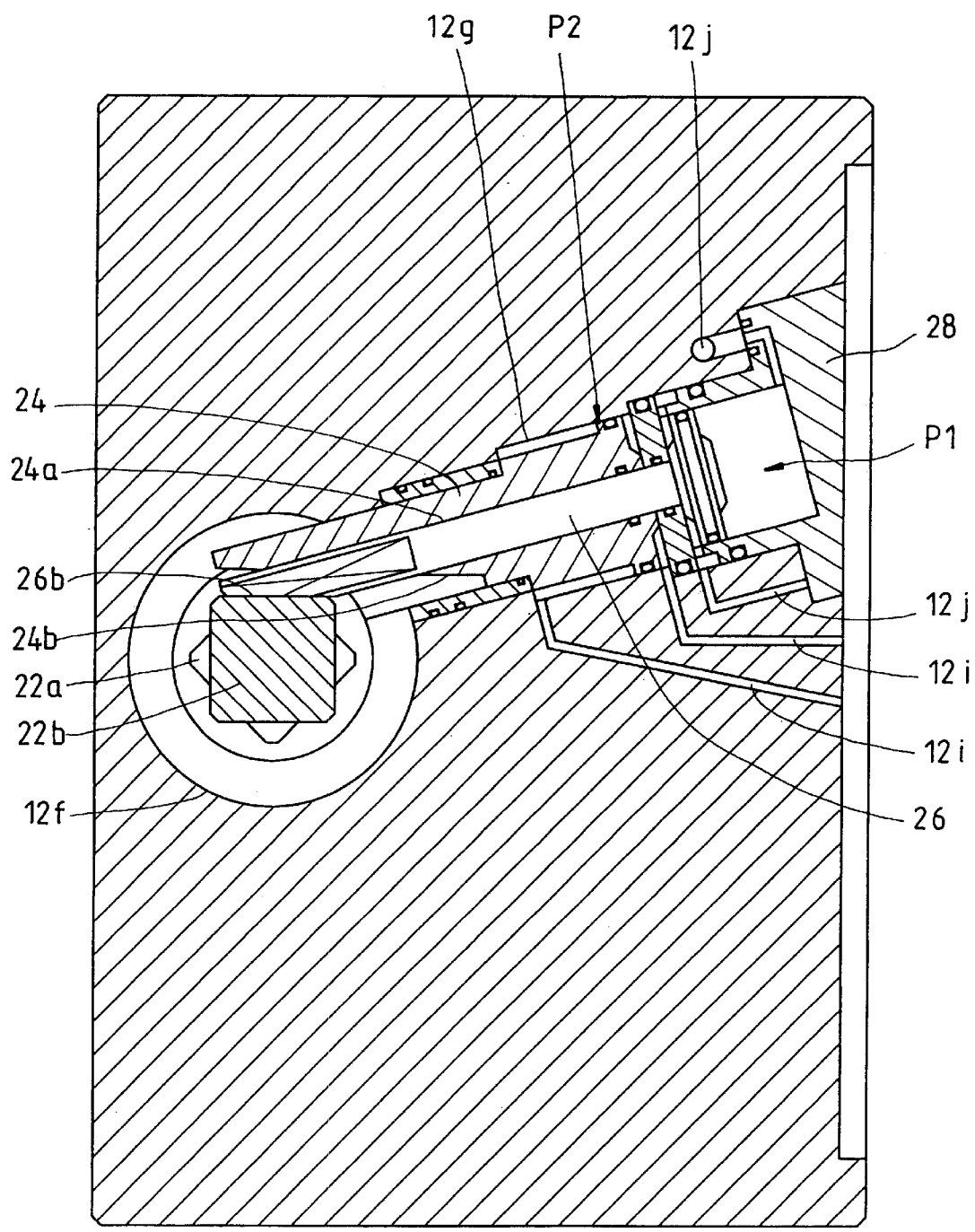
FIG. 8 is a sectional view in an enlarged scale taken along line 8—8 of FIG. 4, showing the position of the first piston rod and second piston rod relative to the rotary shaft.
Figure 9:
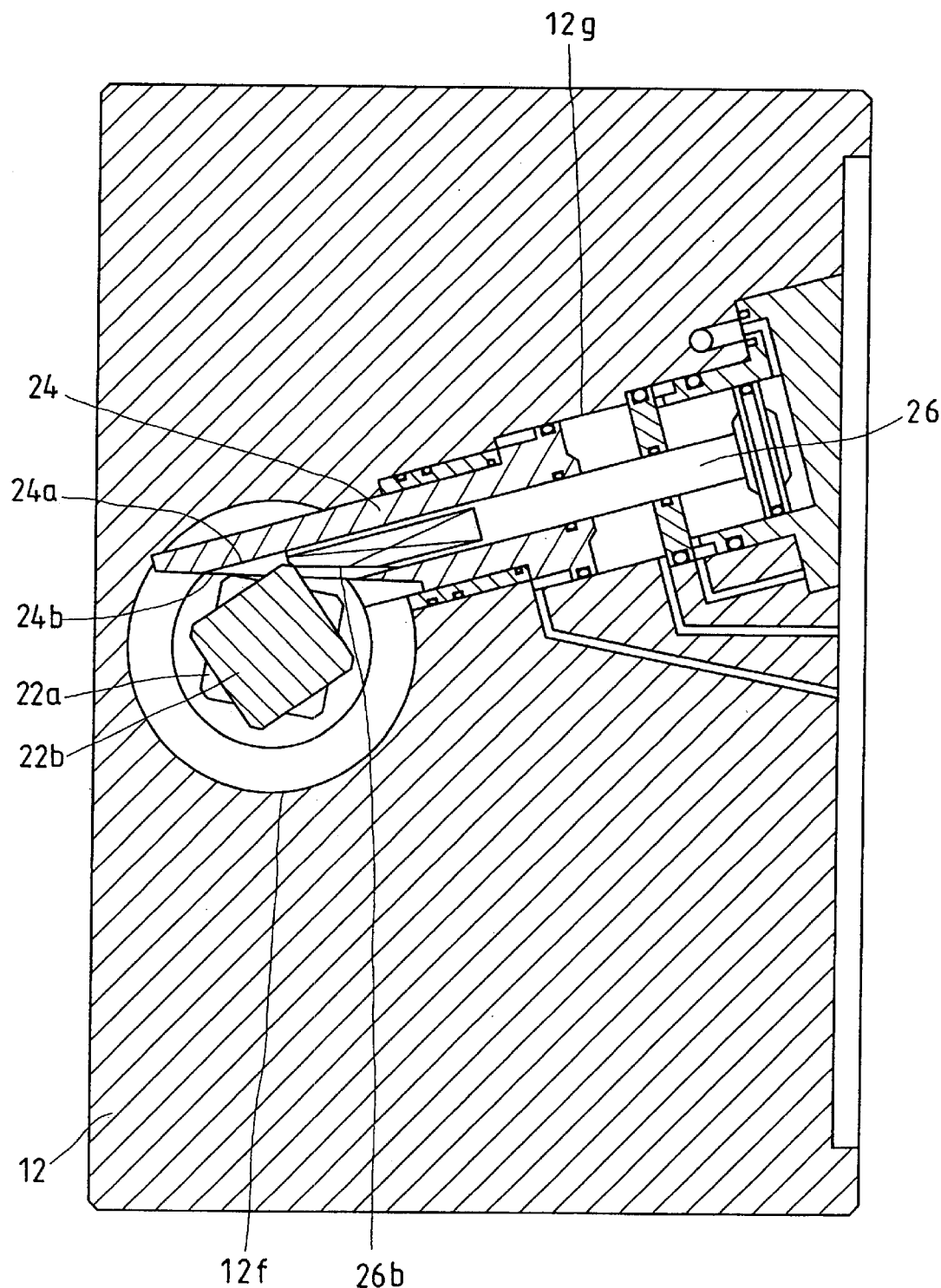
FIG. 9 is similar to FIG. 8 but showing the rotary shaft rotated to another angle.

The operation and features of the graduated chuck assembly 10 are outlined hereinafter. At first, control the flowing direction of the compressed flow of air (fluid) in the first pressure loop 12h to move the axle sleeve 14a and the holding-down rod 14b toward the rotary axle 22, for enabling the workpiece to be held between the holding-down rod 14b and the rotary axle 22 as shown in FIG. 8. At this time, presume that the second piston rod 26 is extended outwards to the extended position P1 to force its beveled stop edge 26b against one side of the second contact portion 22b, and the first piston rod 24 is moved to the position P2 without touching the rotary shaft 22. When rotating the workpiece, control the flowing direction of the compressed flow of air (fluid) in the second pressure loop 12i and the third pressure lop 12j to move the second piston rod 26 axially from the extended position P1 to the retracted position P3 and the first piston rod 24 from the position P2 to the position P4, as shown in FIGS. 9 and 10, thereby causing the first piston rod 24 to force its beveled stop edge 24b against one side of the first contact portion 22a, and therefore the rotary shaft 22 is forced to rotate through 45° as shown in FIG. 10. Thereafter, repeat the aforesaid procedure to alternatively force the beveled stop edge 24b of the first piston rod 24 and the beveled stop edge 26b of the second piston rod 26 against the first contact portion 24b and the second contact portion 26b alternatively, causing the rotary shaft 22 to be rotated step by step at 45° per step.

Further, the first contact portion 22a and the second contact portion 22b can be made having any of a variety of polygonal cross sections having N sides and N angles (N>3). By means of changing the geometric shape of the first contact portion 22a and the second contact portion 22b, the angle per step of the rotation of the rotary shaft 22 is relatively controlled. In case the geometric shape of the first contact portion 22a and the second contact portion 22b is changed, the geometric shape of the positioning portion 22d must be relatively changed, i.e., the positioning portion 22d of the rotary shaft 22 must have a polygonal cross section of which the number of sides is 2N in case the number of sides of the polygonal cross section of the contact portions 22a;22b is N.

As indicated above, because the second piston rod 26 is axially inserted through the first piston rod 24, only one cavity, namely, the third cavity 12g is needed in the base 12 to receive the piston rods 24;26. This design simplifies the fabrication of the chuck assembly 10. Further, because the second piston rod 26 is axially inserted through the first piston rod 24 and mounted with the first piston rod 24 in the third cavity 12g of the base 12, the base 12 fits requirements for different rotary angles, i.e., it is not necessary to change the structure of the base 12 when changing the shape of the cross section of the contact portions 22a;22b.

A prototype of graduated chuck assembly has been constructed with the features of FIGS. 3~10. The graduated chuck assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A graduated rotation control chuck assembly comprising:
   a base, said base comprising a workpiece receiving chamber, said workpiece receiving chamber having a first lateral side and a second lateral side opposite to said first lateral side;
   a holding-down rod mounted in said base inside said first lateral side and aimed at said second lateral side and moved axially in and out of said workpiece receiving chamber; and
   a graduated rotation control unit, said graduation unit comprising a rotary shaft mounted in said base inside said second lateral side and axially aimed at said holding-down rod, said rotary shaft comprising a first contact portion and a second contact portion, a first piston rod, and a second piston rod, said first piston rod and said second piston rod being axially sleeved one inside the other and mounted in said base;
   wherein said first piston rod and said second piston rod are alternatively reciprocated against said first contact portion and second contact portion of said rotary shaft, causing said rotary shaft to be rotated step by step at a fixed angle per step.

2. The graduated rotation control chuck assembly of claim 1 wherein said base comprises a first cavity disposed in communication with said workpiece receiving chamber, and an axle sleeve mounted in said first cavity to hold said holding-down rod, for enabling said holding-down rod to be rotated relative to said base and moved with said sleeve axially in and out of said workpiece receiving chamber.

3. The graduated rotation control chuck assembly of claim 2 wherein said base further comprises a second cavity disposed in communication with said workpiece receiving chamber and adapted to receive said shaft, and a third cavity disposed in communication with said second cavity and adapted to receive said first piston rod and said second piston rod; said first piston rod has an axially extended through hole, which receives said second piston rod for enabling said second piston rod to be coaxially mounted with said first piston rod in said third cavity.

4. The graduated rotation control chuck assembly of claim 3 wherein said first piston rod comprises at least one pin adapted to guide axial movement of said second piston rod relative to said first piston rod and to stop said second piston rod from rotary motion.

5. The graduated rotation control chuck assembly of claim 3 wherein said third cavity comprises a ring spacer disposed between said first piston rod and said second piston rod, said ring spacer defining a center through hole through which said second piston rod is inserted into the axially extended through hole of said first piston rod.

6. The graduated rotation control chuck assembly of claim 5 wherein the first contact portion and said second contact portion of said rotary shaft have a polygonal cross section and are biased from each other at a predetermined contained angle, said polygonal cross section having N number of sides; said first piston rod and said second piston rod each have a beveled stop edge at one end adapted to push one of the sides of the polygonal cross section of said first contact portion and one of the sides of the polygonal cross section of said second contact portion alternatively.

7. The graduated rotation control chuck assembly of claim 6 wherein said predetermined contained angle is 360/2N.

8. The graduated rotation control chuck assembly of claim 6 further comprising a detection unit adapted to detect the position of said rotary shaft during rotary motion of said rotary shaft.

9. The graduated rotation control chuck assembly of claim 8 wherein said detection unit comprises:
   an oil passage disposed in said base and filled with a hydraulic fluid, said oil passage having one end extended to said second cavity and an opposite end extended to the outside of said base;
   an actuating rod sealed in one end of said oil passage and moved axially in and out of said base;
   a spring member mounted in said base and adapted to impart a biased pressure to said actuating rod to force said actuating rod back to the inside of said base;
   a proximity switch mounted in said base and adapted to detect movement of said actuating rod; and
   a push pin axially slidably sealed in an other end of said oil passage, said push pin having one end disposed in contact with a positioning portion of said rotary shaft such that said push pin is driven to force said actuating rod out of said base when rotating said rotary member.

10. The graduated rotation control chuck assembly of claim 9 wherein said push pin has one end mounted with a roller and disposed in contact with the positioning portion of said rotary shaft.

11. The graduated rotation control chuck assembly of claim 9 wherein the positioning portion of said rotary shaft has a polygonal cross section, the polygonal cross section of the positioning portion of said rotary shaft having multiple sides and angles, the number of sides of the polygonal cross section of the positioning portion of said rotary shaft being double the number of sides of each of the first contact portion and second contact portion of said rotary shaft.

12. The graduated rotation control chuck assembly of claim 1 further comprising a positioning rod fixedly mounted in said base and disposed in tangent to an annular groove around the periphery of said rotary shaft to stop said rotary shaft from axial movement when rotated.

* * * * *